(No Model.)  2 Sheets—Sheet 1.
O. BELLMAN.
PIPE ELBOW SCRIBER.
No. 318,843. Patented May 26, 1885.
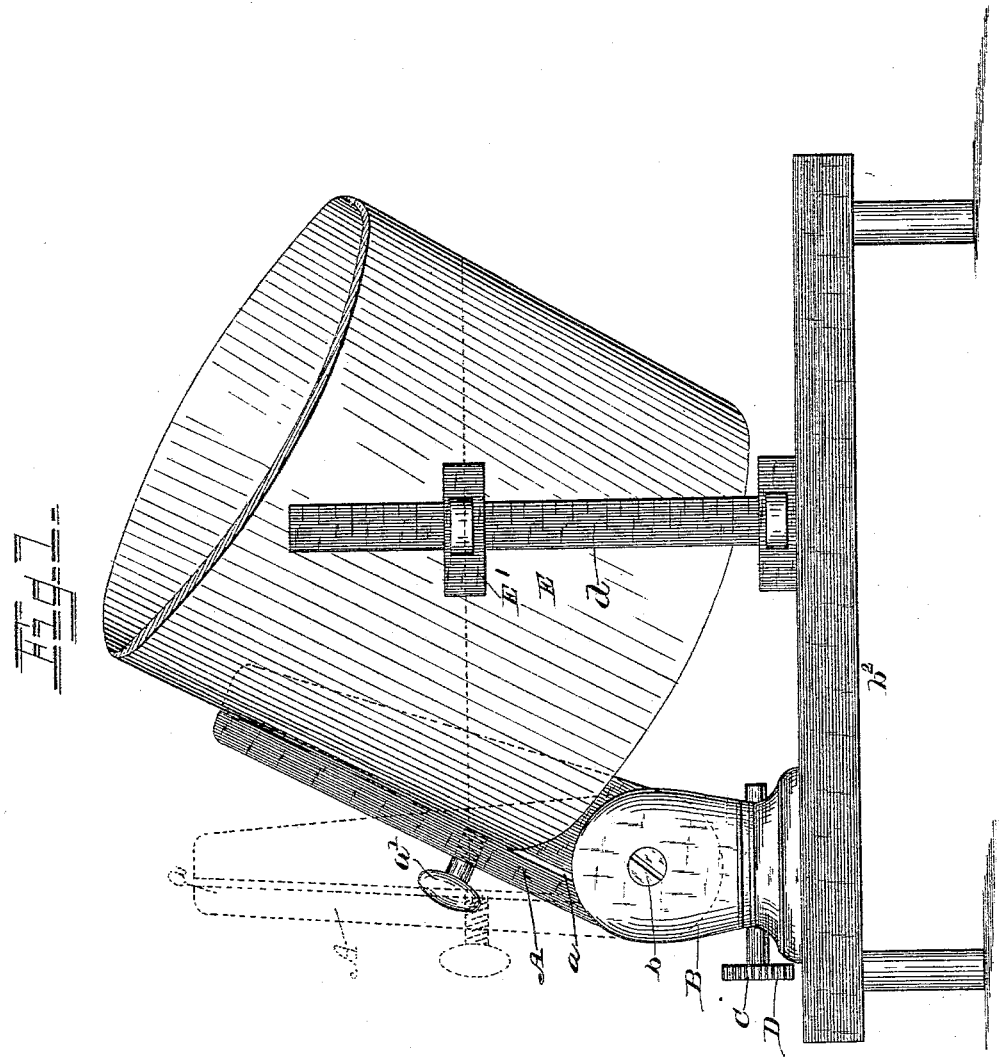
WITNESSES
INVENTOR
Oscar Bellman
By Myers & Co
ATTORNEYS (No Model.) 2 Sheets—Sheet 2.
O. BELLMAN.
PIPE ELBOW SCRIBER.
No. 318,843. Patented May 26, 1885.
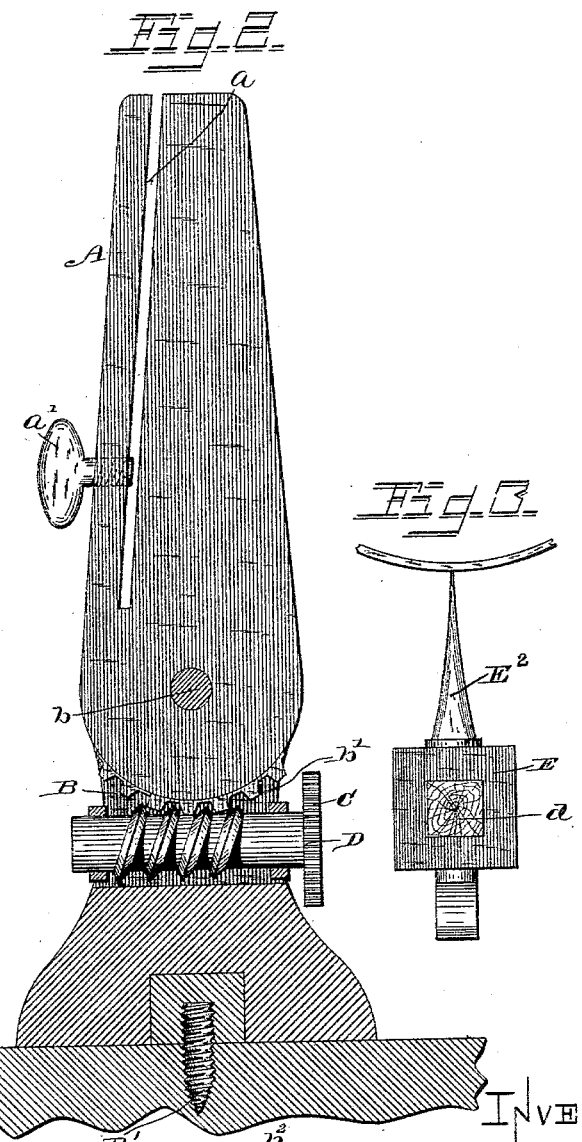

UNITED STATES PATENT OFFICE.

OSCAR BELLMAN, OF HAGERSTOWN, MARYLAND, ASSIGNOR OF ONE-HALF TO SAMUEL D. MARTIN, OF SAME PLACE.

PIPE-ELBOW SCRIBER.

SPECIFICATION forming part of Letters Patent No. 318,843, dated May 26, 1885.

Application filed February 19, 1885. (No model.)

*To all whom it may concern:*

Be it known that I, OSCAR BELLMAN, a citizen of the United States of America, residing at Hagerstown, in the county of Washington and State of Maryland, have invented certain new and useful Improvements in Pipe-Elbow Scribers, of which the following is a specification, reference being had therein to the accompanying drawings.

My invention pertains to certain new and useful improvements in pipe-elbow scribers designed to be employed for marking or indicating the elbows of pipes at any angle from a tubular piece of sheet metal without the use of patterns, thereby avoiding waste of metal; and it consists in the peculiar construction, combination, and arrangement of the parts for accomplishing these results, substantially as hereinafter more fully shown and described.

In the accompanying drawings, Figure 1 is a side elevation of my invention. Fig. 2 is also a side elevation, partly in section; and Fig. 3 is a detail plan view.

In the embodiment of my invention I pivot the arm A, having the longitudinal slit $a$, in bracket B by means of the horizontal pivotal bar $b$, which has its bearings therein. The lower end of arm A is curved, and has secured thereto a corresponding curved screw-threaded plate, $b'$, adapted to engage with the coincident screw-thread of the corresponding part of the helical screw C, which latter is actuated by means of a thumb-wheel, D, the helical screw having suitable pivotal bearings in an orifice formed in bracket B, as shown. The arm A is also provided with the thumb-screw $a'$, disposed in a coincident screw-threaded orifice therein, as shown, which thumb-screw is employed for securing the pipe-section E rigidly in position when inserted in the longitudinal slit $a$ preparatory to scribing the patterns, as shown in Fig. 1.

The bracket B, having formed therein a recess for reception of arm A, has also rigidly secured therein the vertical screw B', which is employed for holding the bracket rigidly to the work bench or table $b^2$.

By rotation of the thumb-wheel D of the helical screw C the arm A is caused to incline forward at any desired angle, and while the pipe is held rigidly in position it is accurately scribed by means of the gage $d$, having rigidly inserted in its slide E' the index or pointer $E^2$, as indicated in the horizontal dotted line, Fig. 1, and by plan view Fig. 3.

By use of my pipe-elbow scriber great economy in both material and labor is effected. It not only prevents waste of metal in cutting pipe-elbows from a tube or pipe, but also serves as an accurate and infallible guide in the construction of patterns, a result which hitherto has not been attained, as under the present system of making pipe-elbow patterns the patterns are seldom or never at first accurately formed, owing to the inability of skilled workmen to make at once from one carefully and accurately prepared pattern another pattern having precisely similar dimensions and contour, even when the greatest care is exercised. Under the system which now prevails several measurements become necessary as the work proceeds, occasioning delays, loss of time, and waste of material, as aforesaid, all of which my invention obviates.

Having thus fully described my invention, what I claim, and desire to secure by Letters Patent, is—

1. For use in scribing pipe-elbows from a tubular piece of sheet metal, a pipe-elbow scriber consisting of a slotted arm pivoted in a bracket and having a screw-threaded plate, and operated by a helical screw, in combination with a gage having a slide and an index or pointer, substantially as shown and described.

2. The slotted arm having a thumb-screw and pivoted in a bracket and having a threaded plate and operated by a helical screw, in combination with a gage having a slide and an index or pointer, substantially as shown and described.

3. The gage having a slide and an index or pointer, in combination with the slotted arm pivoted in a bracket and having a screw-threaded plate and operated by a helical screw, substantially as shown, and for the purpose specified.

4. The combination of the slotted arm A, having thumb-screw $a'$, bracket B, having helical screw D, and plate $b'$, substantially as shown, and for the purpose described.

In testimony whereof I affix my signature in presence of two witnesses.

OSCAR BELLMAN.

Witnesses:
J. NOTA McGILL,
H. J. SCHNEIDER.